(12) United States Patent
Pickett

(10) Patent No.: US 9,340,164 B2
(45) Date of Patent: May 17, 2016

(54) DASHBOARD HANDGUN HOLSTER

(71) Applicant: Gold Star Holsters, LLC, Nixa, MO (US)

(72) Inventor: Trevor Pickett, Nixa, MO (US)

(73) Assignee: GOLD STAR HOLSTERS, LLC, Nixa, MO (US)

( * ) Notice: Subject to any disclaimer, the term of this patent is extended or adjusted under 35 U.S.C. 154(b) by 184 days.

(21) Appl. No.: 14/097,888

(22) Filed: Dec. 5, 2013

(65) Prior Publication Data

US 2014/0166712 A1    Jun. 19, 2014

Related U.S. Application Data

(60) Provisional application No. 61/737,532, filed on Dec. 14, 2012.

(51) Int. Cl.
 *B60R 7/14* (2006.01)

(52) U.S. Cl.
 CPC ............ *B60R 7/14* (2013.01); *Y10T 29/49826* (2015.01)

(58) Field of Classification Search
 CPC .. F41C 33/041; F41C 33/046; F41C 33/0209; F41C 33/048; B60R 7/14; B60R 7/06
 USPC .......................................... 224/911, 912, 261
 See application file for complete search history.

(56) References Cited

U.S. PATENT DOCUMENTS

| | | | | |
|---|---|---|---|---|
| 3,902,639 | A * | 9/1975 | Rogers | F41C 33/0227 224/193 |
| 4,984,725 | A * | 1/1991 | Urbom | B60R 7/14 224/311 |
| 9,010,600 | B1 * | 4/2015 | Gleaton | B60R 7/06 224/556 |
| 2010/0176167 | A1 * | 7/2010 | Hudspeth | B60R 7/14 224/275 |

* cited by examiner

*Primary Examiner* — Corey Skurdal
(74) *Attorney, Agent, or Firm* — Lathrop & Gage LLP

(57) ABSTRACT

A holster for securing a handgun to the dashboard of a car is provided. The handgun holster is adjustably attached to the lower portion of the dashboard, typically below the steering wheel.

15 Claims, 4 Drawing Sheets

DASHBOARD HANDGUN HOLSTER

CROSS REFERENCE TO RELATED APPLICATIONS

This application claims priority of provisional U.S. Patent Application No. 61/737,532 filed on Dec. 14, 2012, which is incorporated herein by reference.

BACKGROUND

The dashboard handgun holster is in the field of holsters for a handgun. More specifically, the dashboard handgun holster is in the field of holsters for use in an automobile. The described handgun holster provides a safe and secure means for storing a handgun in an automobile while allowing the driver quick and easy access to the handgun. The dashboard handgun holster is preferable to storing a handgun on or under a seat because the handgun may shift and be unsafe or difficult to access. The dashboard handgun holster is preferable to storing a handgun in the glove compartment or console because it is easier to retrieve the handgun when needed. The handgun in the dashboard holster is not concealed but is not plainly visible which deters theft. The dashboard handgun holster described herein is also designed to fit snugly against the dashboard without sagging against the driver's legs in an unsafe manner or damaging the vehicle.

SUMMARY OF THE INVENTION

The invention described herein comprises, in embodiments, a holster for securing a handgun to a dashboard of a car comprising a holster component for receiving a handgun comprising a rear panel and a front panel, the rear panel having a bracket, an upper clip attached to a top edge of the rear panel, an upper strap attached to the bracket, a lower strap, a lower clip attached to the lower strap, and means for adjustably attaching the lower strap to the upper strap. In other embodiments of the holster the upper clip and the lower clip comprise hooks formed from sheet material. In further embodiments, the bracket comprises a bracket area of the rear panel extended outwardly from adjacent areas of the rear panel, and two slots disposed through the bracket area for receiving the upper strap. In additional embodiments, the lower clip is provided with a slot for receiving the lower strap. In other embodiments, the front panel of the holster component is molded to receive a specific model of a handgun.

The holster may include means for adjustably attaching the lower strap to the upper strap that comprise an area of hook and loop material attached to each of the upper strap and the lower strap or that comprise a buckle.

A method is disclosed of using the holster, in embodiments, with a dashboard of an automobile having a lower kick panel with an upper edge and a lower edge, comprising the steps of: attaching the upper clip to an upper edge of a lower kick panel, attaching the lower clip to a lower edge of a lower kick panel, pulling the upper strap downward toward the lower clip, pulling the lower strap upward toward the upper clip, and adjustably attaching the upper strap to the lower strap to secure the holster. The method may further comprise the step of disposing a handgun in the holster component.

In other embodiments, a holster for a handgun for releaseable attachment to a lower panel of a dashboard of an automobile is disclosed, the holster comprising a holster component formed from rigid materials, an upper hook attached to a top edge of the holster component, an upper strap attached to the holster component, said upper strap having hook and loop material disposed on a first side thereof, a lower hook having a slot for receiving a lower strap, said lower strap having hook and loop material disposed on a first side thereof.

In some embodiments the holster component comprises a rigid rear panel and a rigid front panel, said front panel being formed to receive a specific model of a handgun. Alternatively, the rigid rear panel of the holster component comprises a raised bracket area, said raised bracket area having a first and a second slot for receiving the upper strap. The first portion of the upper strap is disposed through the first and second slots in the raised bracket area, and the first side of the first portion of the upper strap is secured to the first side of a second portion of the upper strap by engaging the hook and loop material disposed thereon to form a loop in the upper strap through the raised bracket area. A first portion of the lower strap is disposed through the slot in the lower clip, and the first side of the first portion of the lower strap is secured to the first side of a second portion of the lower strap by engaging the hook and loop material disposed thereon to form a loop in the lower strap through the slot in the lower clip. The first side of a third portion of the upper strap is attached to the first side of a third portion of the lower strap to adjustably attach the lower clip to the hoster component.

DETAILED DESCRIPTION OF THE INVENTION

Figure 1:
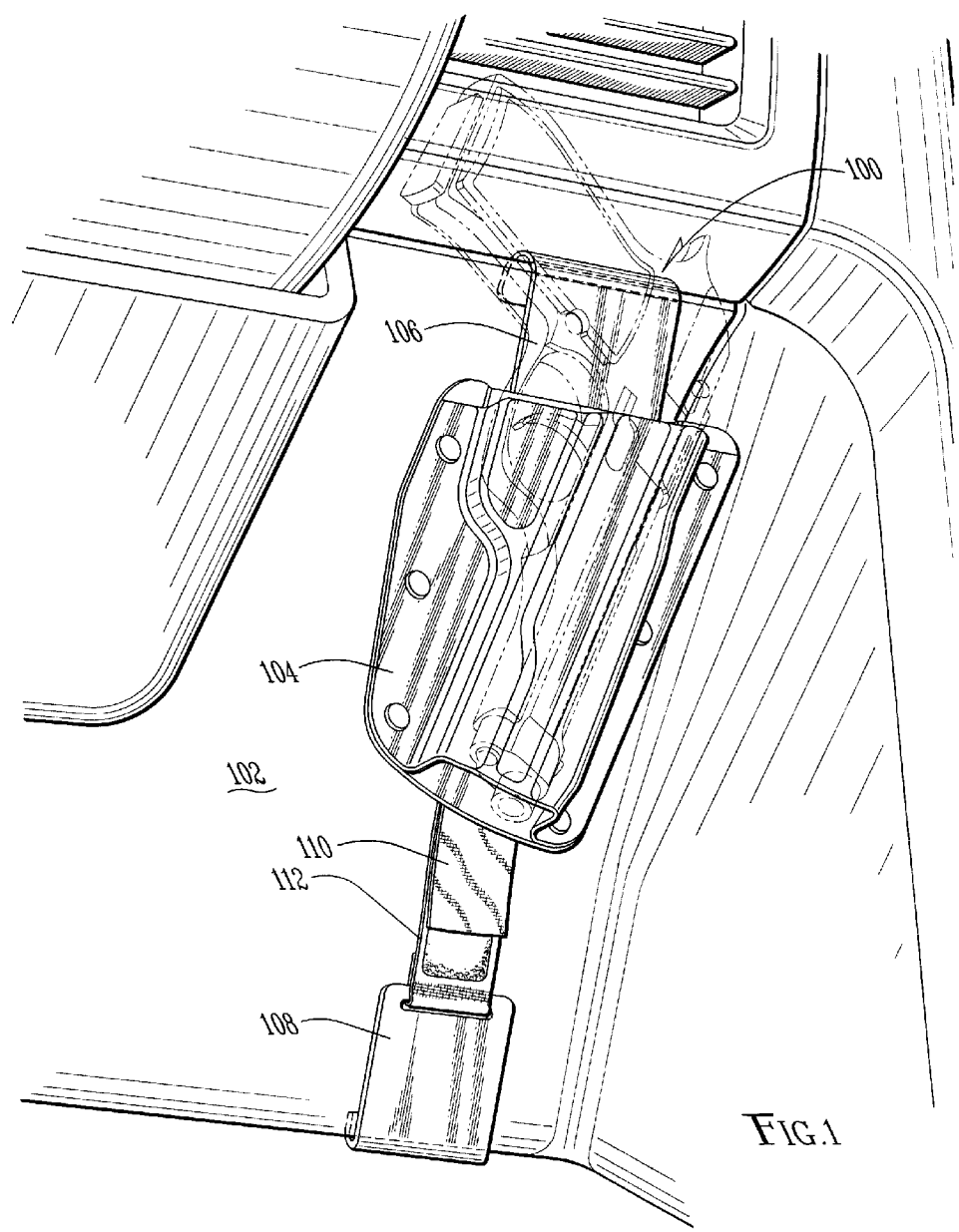
FIG. 1 is a perspective view of an embodiment of the dashboard handgun holster.

Referring now to FIG. 1, an embodiment of the dashboard handgun holster 100 is depicted. The dashboard handgun holster 100 comprises a lower portion and an upper portion which attach to one another to secure the holster to the dashboard of the automobile. The embodiment depicted in FIG. 1 is mounted on the lower dashboard kick panel or valance 102 of the automobile, however depending on the configuration of the dashboard of various automobiles the dashboard handgun holster may be attached to different parts of the dashboard.

The upper portion of the holster comprises a holster component 104, an upper clip 106 and an upper strap 110. The upper clip 106 is provided for clipping over the upper edge of the lower dashboard valance 102 or other appropriate component of the dashboard. The upper strap 110 is attached to holster component 104 or to the upper clip 106, and extends downwardly therefrom. The upper strap 110 may be fed through a slot in the holster component 104 or upper clip 106 and attached via hook and loop material, sewn or otherwise secured to itself, or attached thereto by rivets or other means of attachment. An area of hook and loop material, not shown in FIG. 1, is attached to upper strap 110 to engage a similar area of hook and loop material on the lower strap 112. The upper strap 110 is disposed so that the hook and loop material is disposed toward the dashboard when the upper clip 106 is engaged with the lower dashboard valance 102 or other dashboard component.

The lower portion of the holster comprises a lower clip 108 and a lower strap 112. The lower clip 108 is provided for clipping over the lower edge of the lower dashboard valance 102 or other dashboard component. The lower strap 112 is attached to the lower clip 108, and extends upwardly from the lower clip 108. The lower strap 112 may be fed through a slot in the lower clip 108 and attached via hook and loop material, sewn or otherwise secured to itself, or attached to the lower clip 108 by rivets or other means of attachment. An area of hook and loop material, partially visible in FIG. 1 is attached to lower strap 112 to engage the area of hook and loop material on the upper strap 110.

The lower strap 112 is disposed so that the hook and loop material is disposed away from the dashboard when the lower clip 108 is engaged with the lower dashboard valance 102 or other dashboard component. In an embodiment, the areas of hook and loop material on straps 110 and 112 may extend along the entire length of one side of the straps 110 and 112, and is used to attach the straps to the holster component 104 and the lower clip 108 respectively, as well as to each other. The hook and loop material or other means of attachment allows the straps to be attached to each other adjustably so that they may fit various dashboard components.

The areas of hook and loop material may be replaced with other materials that function in a similar manner to adjustably secure two straps together. In embodiments the means of adjustably attaching the lower strap to the upper strap may include hook and loop material affixed to each strap, buckles of various types including without limitation, quick release, snap lock, lever lock, Tabler, slide lock or other buckles.

The upper clip 106 and lower clip 108 are typically formed from a sheet material so that they extend laterally and are thin to allow them to clip over the edge of the dashboard component to which they are attached. They are also wide enough to resist lateral movement or twisting of the upper strap 110 and lower strap 112. The upper clip 106 and lower clip 108 may be formed from steel, plastic or any other similar or suitable material that is capable of providing a suitably rigid hook shape.

Upper clip 106 is attached to the upper edge of holster component 104 or may be formed as a part of holster component 104. Holster component 104 maintained closely against the dash of the automobile by the upper and lower clips 106 and 108 of the holster 100. The holster component 104 may be designed to position the gun for easy drawing by either a right-handed or left-handed person, and is oriented to allow a user to reach down from the steering wheel and easily draw the gun from the holster 100 when needed. The holster may be made from a variety of materials, and may be formed for a specific handgun or for use with a variety of handguns. In one embodiment, the holster component 104 is designed to fit a specific model of handgun and is formed from a rigid material such as Kydex to closely fit the handgun. A holster component 104 designed to fit a specific model of handgun reduces noise or movement that may result from vibrations that are encountered in an automobile.

Figure 2:
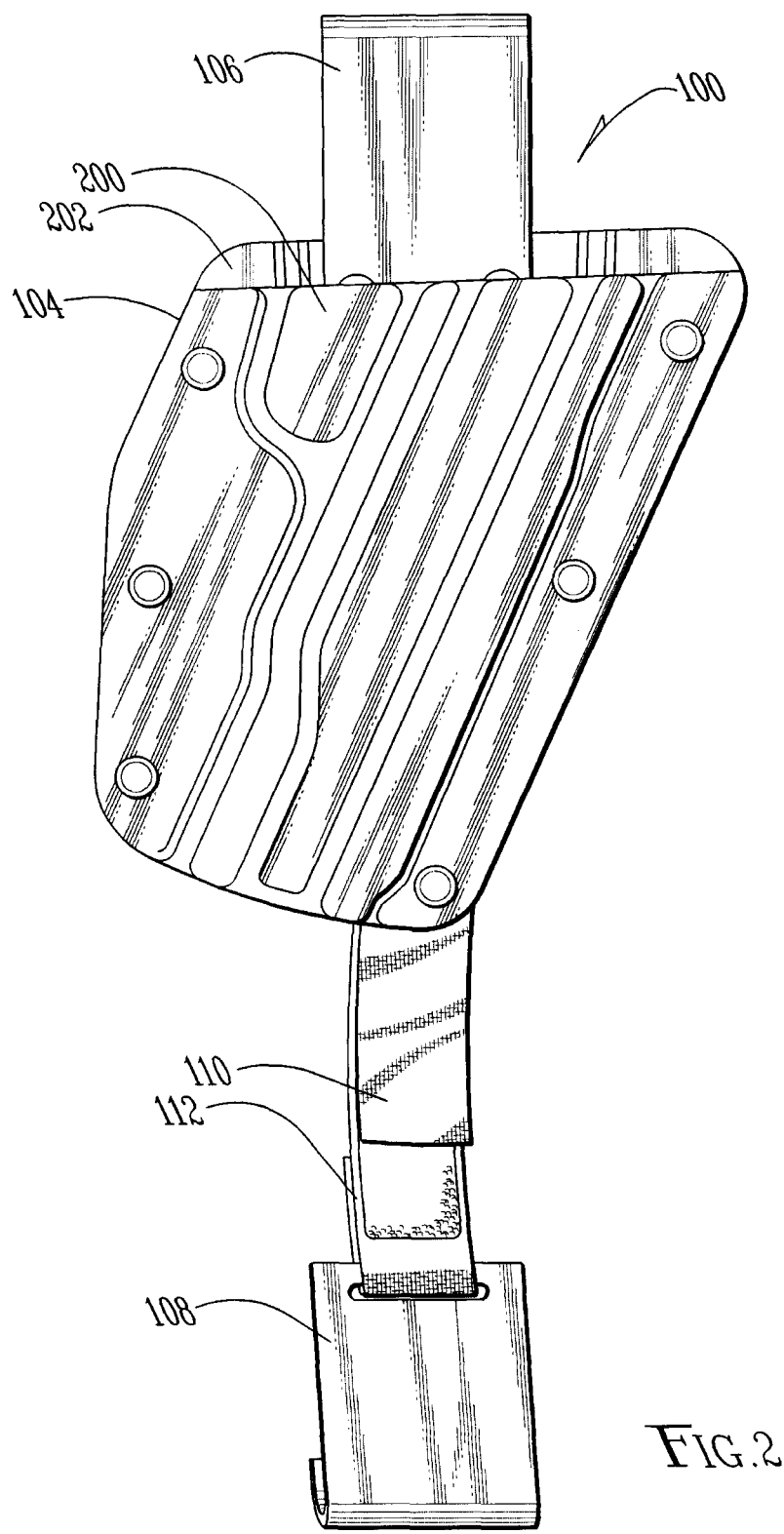
FIG. 2 is a front view of an embodiment of the dashboard handgun holster.

Referring now to FIG. 2, a front view of an embodiment of the dashboard handgun holster is depicted. The holster component 104 has a front panel 200 and a rear panel 202. The panels 200 and 202 may be formed as a single piece or formed from one or more sheets of material joined together at the edges thereof by rivets (as depicted), screws, sewing, adhesive or other similar fasteners or means of attachment. The holster component may be formed from leather, kydex, plastic or other similar materials that are strong and rigid enough to support the weight of a handgun. A handgun may be disposed and securely held between the front and rear panels 200 and 202 of the holster component 104.

Upper clip 106 is attached to the rear panel 202 of holster component 104. The clip 106 may be attached by machine screws and nuts (as depicted), rivets, sewing, adhesive or other similar means of attachment, or upper clip 106 may be formed as a part of rear panel 202. Clip 106 extends upward therefrom and the hook portion of clip 106 curves away from holster component 104. Straps 110 and 112 are shown with engaged areas of hook and loop material for securing the two straps 110 and 112 together. Lower strap 112 is shown looped through a slot in the upper end of lower clip 108 and secured to itself to form a connection to lower clip 108. In other embodiments the lower strap 112 may be attached to lower clip 108 utilizing different fasteners or means of attachment such as rivets, sewing, adhesives, without limitation.

Figure 3:
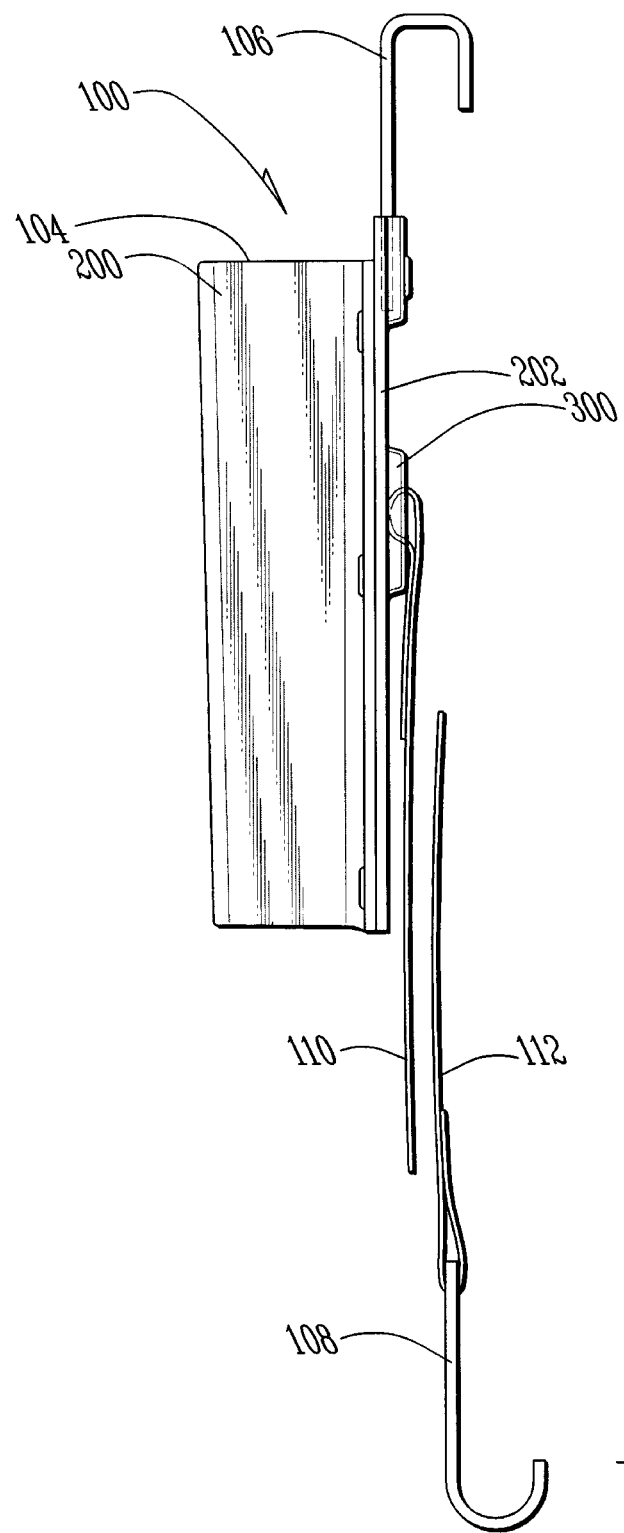
FIG. 3 is aside view of an embodiment of the dashboard handgun holster.

Referring now to FIG. 3, a side view of an embodiment of the dashboard handgun holster is depicted. Upper clip 106 is shown attached to rear panel 202 of holster component 104 by machine screws and nuts, though other fasteners may be utilized. The hook portion of clip 106 extends away from front panel 200 of holster component 104. Attachment point 300 is provided on rear panel 202 for attaching to upper strap 110. In the depicted embodiment, upper strap 110 is shown looped through attachment point 300 and attached to itself to form a connection to rear panel 202, though in other embodiments various fasteners or means of attachment such as rivets, bolts, screws, sewing, or adhesives, without limitation. Lower strap 112 is shown attached to lower clip 108. Upper and lower straps 110 and 112 are shown slightly separated from one another.

Figure 4:
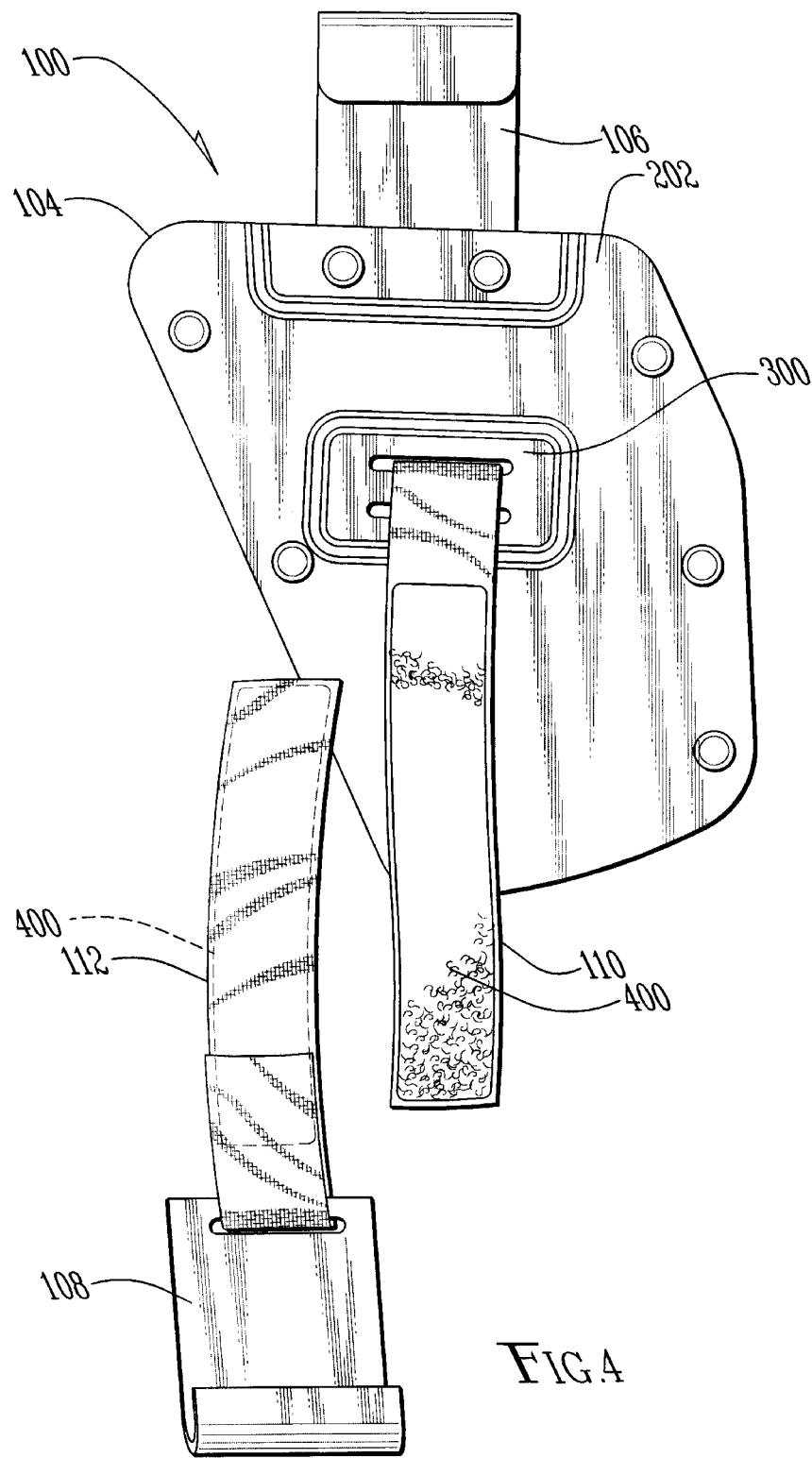
FIG. 4 is a back view of an embodiment of the dashboard handgun holster.

Referring now to FIG. 4, a rear view of an embodiment of the dashboard handgun holster is depicted. The upper and lower portions of the holster are shown disconnected from one another, as in FIG. 3. In the depicted embodiment, Attachment point 300 comprises a bracket attached to real panel 202, or formed as a part of rear panel 202 with two slots disposed therein for receiving upper strap 110. The bracket extends outwardly from the adjacent areas of the rear panel 202 so that the strap 110 and the handgun in the holster do not chafe or abrade each other. The strap 110 is disposed through the two slots, around a central area of the bracket, and strap 110 is looped and secured to itself to form the attachment to holster component 104. In other embodiments of the handgun holster, attachment point 300 may comprise other types or configurations of brackets, or other types or means of fasteners or means of attachment for upper strap 110 to rear panel 202.

Upper and lower straps 110 and 112 are provided with hook and loop material 400 on one side or face of each strap. In the depicted embodiment, the area 400 on upper strap 110 is shown disposed on the face of strap 110 that is away from holster component 104 and the area 400 on lower strap 112 is shown disposed on the face of strap 112 that is towards holster component 104. In other embodiments that configuration may be reversed.

When utilizing the dashboard handgun holster in an automobile, the upper clip 106 is disposed over the top edge of the lower kick panel 102 or valance of the dashboard. The lower clip 108 is then disposed over the lower edge of the lower kick panel 102. The upper and lower straps 110 and 112 are then pulled tight in opposite directions so that the holster component 104 is pulled tightly against the lower kick panel 102. The hook and loop material 400 on each strap 110 and 112 are engaged to each other securing the upper and lower portion of the holster. The holster 100 is ready to receive a handgun for storage.

In one embodiment of the holster 100, the holster component 104 is formed from a material such as Kydex that may be thermoformed to fit a specific handgun, or plastic that may be molded to fit a specific handgun. In the depicted embodiment of the holster 100, the front panel 202 of the holster component 104 is thermoformed from Kydex by heating a sheet of Kydex and forming it over a gun mold for a specific model of handgun. The rear panel 202 is also formed from Kydex by thermoforming two raised areas. One raised area is the bracket for attachment point 300 and the other is the attachment point for upper clip 106. The clips 106 and 108 may also be formed from Kydex, molded plastic or sheet metal, among others.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. A holster for securing a handgun to a lower panel of a dashboard of a car, the holster comprising:
    a holster component for receiving a handgun comprising a rear panel and a front panel, the rear panel having a bracket;
    an upper clip directly attached to a top edge of the rear panel of the holster, the upper clip for engaging an upper edge of the lower panel of the dashboard;
    an upper strap attached to the bracket;
    a single lower strap extending below a lower edge of the rear panel and in an opposite direction to the upper clip;
    a lower clip attached to the lower strap, the lower clip for engaging a lower edge of the lower panel of the dashboard; and
    means for adjustably attaching the lower strap to the upper strap.

2. The holster of claim 1 wherein the upper clip and the lower clip comprise hooks formed from sheet material.

3. The holster of claim 1 wherein the bracket comprises a bracket area of the rear panel extending outwardly from adjacent areas of the rear panel, and two slots disposed through the bracket area for receiving the upper strap.

4. The holster of claim 3 wherein the lower clip is provided with a slot for receiving the lower strap.

5. The holster of claim 4 wherein the front panel of the holster component is molded to receive a specific model of a handgun.

6. The holster of claim 5 wherein the means for adjustably attaching the lower strap to the upper strap comprise an area of hook and loop material attached to each of the upper strap and the lower strap.

7. The holster of claim 5 wherein the means for adjustably attaching the lower strap to the upper strap comprise a buckle.

8. A method of using the holster of claim 1 with a dashboard of an automobile having a lower kick panel with an upper edge and a lower edge, comprising the steps of:
    attaching the upper clip to an upper edge of a lower kick panel;
    attaching the lower clip to a lower edge of a lower kick panel;
    pulling the upper strap downward toward the lower clip;
    pulling the lower strap upward toward the upper clip;
    adjustably attaching the upper strap to the lower strap to secure the holster.

9. The method of claim 8 further comprising the step of disposing a handgun in the holster component.

10. A holster for a handgun for releaseable attachment to a lower panel of a dashboard of an automobile for securing a handgun in a substantially vertical orientation, the holster comprising:
    a holster component formed from rigid materials;
    an upper hook directly attached to a top edge of the holster component, the upper hook disposed to engage an upper edge of the lower panel of the dashboard;
    an upper strap attached to the holster component, said upper strap having hook and loop material disposed on a first side thereof;
    a lower hook having a slot for receiving a lower strap, the lower hook disposed to engage a lower edge of the lower panel of the dashboard;
    said lower strap having hook and loop material disposed on a first side thereof, the lower strap extending below a lower edge of the rear panel of the holster and substantially opposite to the upper clip.

11. The holster of claim 10 wherein the holster component comprises a rigid rear panel and a rigid front panel, said front panel being formed to receive a specific model of a handgun.

12. The holster of claim 11 wherein the rigid rear panel of the holster component comprises a raised bracket area, said raised bracket area having a first and a second slot for receiving the upper strap.

13. The holster of claim 12 wherein a first portion of the upper strap is disposed through the first and second slots in the raised bracket area, and the first side of the first portion of the upper strap is secured to the first side of a second portion of the upper strap by engaging the hook and loop material disposed thereon to form a loop in the upper strap through the raised bracket area.

14. The holster of claim 13 wherein a first portion of the lower strap is disposed through the slot in the lower clip, and the first side of the first portion of the lower strap is secured to the first side of a second portion of the lower strap by engaging the hook and loop material disposed thereon to form a loop in the lower strap through the slot in the lower clip.

15. The holster of claim 14 wherein the first side of a third portion of the upper strap is attached to the first side of a third portion of the lower strap to adjustably attach the lower clip to the holster component.

* * * * *